US008030441B2

(12) United States Patent
Toncelli

(10) Patent No.: US 8,030,441 B2
(45) Date of Patent: Oct. 4, 2011

(54) METHOD AND PLANT FOR RENDERING INERT TOXIC SUBSTANCES IN UNCOMPACTED RESIDUAL MATERIAL CONTAINING HARDENABLE RESIN AND AGGREGRATES

(76) Inventor: Dario Toncelli, Bassao Del Grappa (IT)

( * ) Notice: Subject to any disclaimer, the term of this patent is extended or adjusted under 35 U.S.C. 154(b) by 0 days.

(21) Appl. No.: 12/376,239

(22) PCT Filed: Jul. 10, 2007

(86) PCT No.: PCT/IB2007/052750
§ 371 (c)(1),
(2), (4) Date: Apr. 7, 2009

(87) PCT Pub. No.: WO2008/015596
PCT Pub. Date: Feb. 7, 2008

(65) Prior Publication Data
US 2010/0160708 A1    Jun. 24, 2010

(30) Foreign Application Priority Data

Aug. 4, 2006    (IT) .............................. TV2006A0141

(51) Int. Cl.
*C08F 6/00*    (2006.01)
*C08G 64/00*    (2006.01)
(52) U.S. Cl. ........ 528/480; 219/765; 219/772; 219/774; 219/776; 219/777; 219/779; 425/174.2; 528/176; 528/190; 528/192; 528/193; 528/194
(58) Field of Classification Search ................... 219/765, 219/772, 774, 776, 777, 779; 425/174.2; 528/176, 190, 192, 193, 194, 480
See application file for complete search history.

(56) References Cited

U.S. PATENT DOCUMENTS

| 4,315,875 | A | * | 2/1982 | Hoedt ........................... 264/430 |
| 4,698,010 | A | | 10/1987 | Toncelli |
| 5,871,678 | A | | 2/1999 | Brotz |
| 2008/0116617 | A1 | * | 5/2008 | Toncelli ........................ 264/444 |

FOREIGN PATENT DOCUMENTS

| EP | 0412055 | | 2/1991 |
| EP | 412055 | * | 1/1992 |
| EP | 0786325 | | 7/1997 |
| EP | 0 786 325 | | 12/2001 |
| EP | 1 027 205 | | 7/2002 |
| IT | 1181570 | | 9/1987 |
| WO | 2005084924 | | 9/2005 |

OTHER PUBLICATIONS

International Search Report and Written Opinion dated Feb. 18, 2008 from the corresponding PCT/IB2007/052750.
International Preliminary Report dated Nov. 10, 2008 from the corresponding PCT/IB2007/052750.

* cited by examiner

*Primary Examiner* — Terressa Boykin
(74) *Attorney, Agent, or Firm* — Katten Muchin Rosenman LLP

(57) ABSTRACT

A loose mixture formed of one or more solid inert materials and a hardenable resin dissolved in an organic solvent, in particular the remainder of the initial mix used for the manufacture of conglomerate stone sheets, is rendered inert by means of dielectric heating at a frequency of less than 300 MHz. A plant for implements a method where a loose mixture is formed of one or more solid inert materials and a hardenable resin dissolved in an organic solvent, in particular the remainder of the initial mix used for the manufacture of conglomerate stone sheets, is rendered inert by means of dielectric heating at a frequency of less than 300 MHz.

14 Claims, 1 Drawing Sheet

METHOD AND PLANT FOR RENDERING INERT TOXIC SUBSTANCES IN UNCOMPACTED RESIDUAL MATERIAL CONTAINING HARDENABLE RESIN AND AGGREGRATES

BACKGROUND OF THE INVENTION

1. Field of the Invention

The present invention relates to a method and the related plant for rendering inert a loose mixture containing a hardenable resin with an organic solvent and solid inert materials.

2. Description of the Related Art

There are numerous industrial applications which make use of mixtures containing hardenable resins dissolved in organic solvents.

One industrial application which envisages the use of hardenable resins relates to the manufacture of conglomerate stone articles. An example consists in the articles which are produced using the so-called "Bretonstone technology" where an initial mix, formed of particles of stone, ceramic or stone-like aggregate with a controlled particle size, a fine filler and a binder, is deposited on a temporary support, subjected to a compaction step by means of vacuum vibrocompression and then transferred for the hardening step which is performed in the presence of a catalyst when the binder consists of a resin. For a description of the aforementioned Bretonstone technology reference may be made, for example, to the following patents: IT-A-1,181,570 relating to preparation of the initial mix, EP-A-0,786,325 and 1,027,205 relating to the use of organic binders.

The binder products used are preferably polyester resins, diluted with a reactive monomer such as styrene, which participates actively in the catalytic hardening step.

For this reason the initial mix usually also contains the catalyst and, where necessary, a catalysis accelerator/initiator.

It must be pointed out firstly that polyester resin is a synthesis product derived from petroleum, the problems of which as regards its impact on the environment are well-known.

Moreover, the presence in the mix of the styrene monomer as a reactive solvent of the polyester resin gives rise to various environmental problems associated with its toxic nature and the danger of explosion because of its high volatility: sophisticated and costly plants for capturing and eliminating the styrene vapours are in fact necessary in order to comply with increasingly stringent regulations.

Even though individually the resin and solvent are problematic from an environmental point of view because of the risk of pollution, in the case of Bretonstone technology, the final product—in other words the conglomerate stone sheets or blocks—is totally inert since the resin is catalysed and hardened in a solid non-reactive state.

Management of the initial mix, however, is problematic: in fact, when plants which perform all the stages of production of the articles are used, during relatively long stoppages of the machines (for example from a previous evening to the following morning), the disadvantage is that a certain quantity of initial mix remains unused and, since it cannot be compacted and converted into the final product, must be disposed of. The uncompacted mix is a loose and soft granular mass.

In this latter case, however, the polyester resin dissolved in the styrene within the mix is in the active state and therefore it is of a potentially polluting nature.

A similar problem arises with the remainder of mix resulting from cleaning of the production line and in particular the equipment for preparing and distributing the mix onto the forming moulds; it may also be in the form of a granular and loose mass.

Is therefore required to dispose of the unused mix in special waste tips which are equipped to deal with the so-called toxic waste, with obvious management and disposal costs.

SUMMARY OF THE INVENTION

The main object of the invention is therefore to eliminate the risks of pollution by resins which are still active since they are dissolved in a solvent, for example contained in a mix which cannot be used, by rendering them inactive or inert.

These object is achieved by means of a method for rendering inert a loose and porous mix comprising a solid aggregate, a filler and said hardenable resin dissolved in an organic solvent, characterized in that said mix is subjected to a dielectric heating step.

With the method it is therefore possible to obtain a material which is totally inert and which, although it can no longer be used for the production of conglomerate articles, has the considerable advantage that it is not toxic and harmful from an environmental point of view.

Since it no longer has toxic properties due to the resin in the active state and the styrene, the inert material obtained with the method according to the invention may be disposed of also in ordinary waste tips without the need for special measures or treatment in external plants.

In turn the plant according to the present invention, which is suitable for implementing the method defined above, is characterized in that it comprises an oven in which the mixture to be rendered inert, in particular the initial mix indicated above, preferably in the form of small heaps or mounds, undergoes heating using as a heat source a generator of radiofrequency waves, namely waves which have a frequency not greater than 300 MHz.

BRIEF DESCRIPTION OF THE DRAWINGS

The aspects and advantages of the present invention will emerge more clearly from the following detailed description, relating to the Bretonstone technology and provided purely by way of a non-limiting example, with reference to the accompanying drawings in which.

DETAILED DESCRIPTION OF THE INVENTION

In the case of resins used to obtain composite sheets or blocks of conglomerate material using Bretonstone technology, the method according to the present invention is advantageously applied to the residual mix and to the cleaning waste following a relatively prolonged stoppage of the production plant.

According to the invention, the uncompacted waste is thus introduced inside an oven which uses as a heat source a generator of radiofrequency waves, i.e. at a frequency of less than 300 MHz, and is heated to temperatures of 100-120° C. and kept at this temperature for a period of 15-20 minutes.

Owing to the action of the catalyst and the additives present in the initial mix, the polyester resin contained in the mix is thus catalysed, bonding all the styrene contained inside it.

The radiofrequency waves allow rapid heating internally of the soft mass of uncompacted mix, causing catalysis of the resin and combination of the monomer contained inside it.

The same result would not be obtained with other heat sources generally used in the industry; heating with hot air or with infrared rays would in fact result only in superficial heating of the granular mass and moreover cause rapid evaporation of the styrene, the absence of which would then make catalysis of the resin impossible.

The radiofrequency waves used have a frequency of less than 300 MHz (maximum limit) and preferably between 25 and 35 MHz. The frequency is chosen so as to guarantee an optimum heating efficiency depending on the type of resin and aggregate with which the material of the mix is formed.

By means of heating with radiofrequency waves, the polyester resin is also rendered inert and therefore no longer polluting and the reactive styrene is also bonded to the resin and therefore loses its toxicity.

Figure 1:
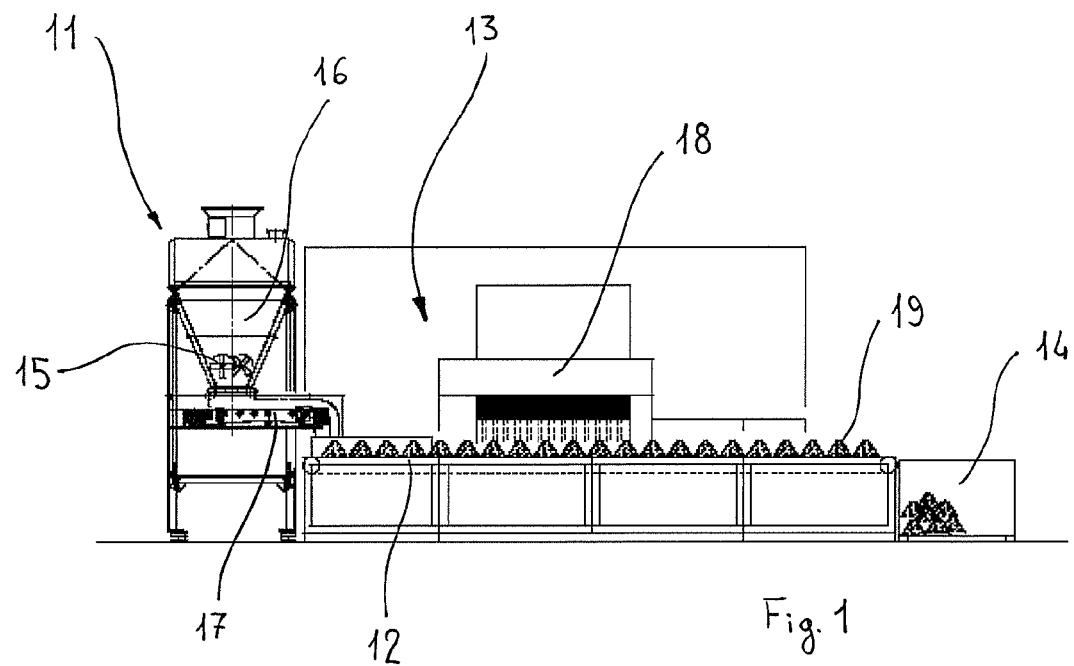
FIG. 1 is a cross-sectional side view of the plant for rendering material inert according to the invention.
Figure 2:
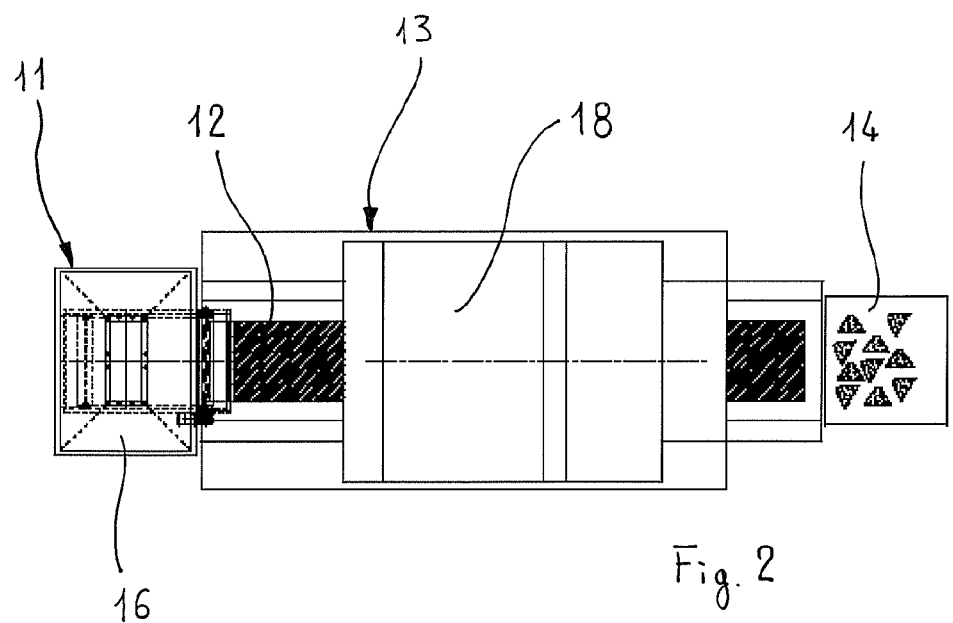
FIG. 2 is a top plan view of the plant according to FIG. 1.

According to one constructional solution of the invention, the plant for rendering material inert comprises, as shown in FIGS. 1 and 2, a station 11 for charging the mix to be rendered inert, a station 13 for heating said mix by means of a dielectric heating oven 18, and a station 14 for discharging the inert mix.

In particular, the charging station 11 has a hopper 16 containing the mix to be rendered inert, i.e. the residual mix and the cleaning waste. This mix is broken up into small fragments by means of a lump-breaking device 15 of the known type with blades having two counter-rotating shafts and then conveyed by an extractor belt 17 onto conveying means 12, preferably of the belt type, of the heating station 13. In this way the mix is present in the form of a soft and loose mass.

The material to be treated, in the form of lumps or mounds or in a fairly small-size mass, is charged onto the conveyor means 12, forming for example a layer with a thickness of 5-20 cm, and together with the conveyor means 12 passes through the antennae of a tunnel oven 18 where it undergoes radiofrequency heating. Preferably, the soft mass is charged onto the belt 12 in the form of small piles 19 which are about 10-20 cm high and spaced from each other by a few centimetres; in this way the catalysed mix leaving the oven 18 is in the form of hard and porous agglomerations having dimensions of a few tens of centimetres, which may be easily conveyed to the discharging station 14 or into a storage container.

In the case of a plant functioning using the Bretonstone technology for the production of sheets of agglomerated material and implementing the method according to the invention, said plant therefore comprises in succession:
  a first station for preparing the mix by mixing a granulated material of predetermined particle size and a fine filler with an organic binder;
  a second station for distributing said mix inside a tray mould so as to form a layer of mix;
  a third station for performing vacuum vibrocompression so as to obtain a compacted sheet;
  a fourth catalysis station comprising heating ovens for catalysis of the organic binder so as to obtain the final sheet; and
  a station with an oven where dielectric heating is performed at radiofrequency so as to render inert the residual mix and the cleaning waste, operating as a plant for rendering material inert as described above.

The inert material thus obtained may be transported to a normal waste tip without the need for special authorisation or, alternatively, may be used for different purposes.

For example, the inert material may be used as a filling aggregate or foundation material in building work or, after being crushed to a suitable particle size, may be used as a filling aggregate for the preparation of concrete or other cement mortars.

Obviously the method according to the invention which envisages the use of radiofrequency waves for rendering inert polyester resin present in a mixture may also be used for industrial applications for the neutralisation or reclamation of products other than the residual mix arising in the Bretonstone technology.

Functionally or conceptually equivalent modifications and variations are possible and may be envisaged while remaining within the scope of the invention as defined by the following claims.

The invention claimed is:

1. A method for rendering environmentally inert toxic substances in residual material from a production of agglomerated material, the method comprising the step of:
   (a) subjecting the residual material to dielectric heating using radiofrequency electromagnetic waves having a frequency of less than 300 MHz; the residual material comprising an uncompacted mixture of aggregates of the agglomerated material, a hardenable resin, and a catalyst; the hardenable resin being mixed with the aggregates and being dissolved in an organic solvent; the toxic substances comprising a resin and a styrene;
   (b) raising a temperature of the residual material by dielectric heating in step (a) to 100-200 degrees Centigrade; and
   (c) maintaining the temperature in step (b) between 100-200 degrees Centigrade for 15-20 minutes catalyzing the styrene and the resin to render the toxic substances environmentally inert.

2. Method according to claim 1, wherein the resin is a polyester resin dissolved in styrene and said mixture comprises a thin filler.

3. Method according to claim 1, wherein the radiofrequency waves have a frequency of between 25 and 35 MHz.

4. A industrial production plant for rendering environmentally inert toxic substances in residual material from a production of agglomerated material, the production plant comprising:
   a first station for loading the residual material; the residual material comprising an uncompacted mixture of aggregates of the agglomerated material, a hardenable resin, and a catalyst; the hardenable resin being mixed with the aggregates and being dissolved in an organic solvent;
   a heating station comprising a dielectric heating oven, the heating station for heating the residual material with the dielectric heating oven using radiofrequency electromagnetic waves having a frequency of less than 300 MHz, raising a temperature of the residual material by dielectric heating to 100-200 degrees Centigrade, and maintaining the temperature between 100-200 degrees Centigrade for 15-20 minutes catalyzing styrene and the resin to render the toxic substances environmentally inert; and
   a discharging station for discharging the inert residual material.

5. The industrial production plant according to claim 4, wherein the electromagnetic waves comprise a frequency of between 25 and 35 MHz are used in said heating station.

6. The industrial production plant according to claim 4, wherein the heating station comprises a conveyor belt for depositing the residual material in a layer having a thickness of 5-20 cm.

7. The production plant according to claim 6, wherein the layer is divided into small heaps or mounds with a height of 10-20 cm.

8. A industrial production plant for producing a sheet of agglomerated material, the production plant comprising:

a first station for preparing an initial mix by mixing a granulated material of predetermined particle size and a fine filler with a hardenable resin dissolved in a reactive organic solvent to which a catalyst is added;

a second station for distributing said initial mix inside a temporary support to form a layer of the mix;

a third station for vacuum vibrocompressing the deposited mix to obtain a compacted uncured sheet;

a fourth station comprising a heating oven for catalysis of the resin to, obtain a cured sheet, and a dielectric heating oven for rendering environmentally inert toxic substances contained in a residual material of the initial mix and in waste resulting from cleaning the first through fourth stations, the residual material comprising an uncompacted mixture of aggregates of the agglomerated material, the hardenable resin, and a catalyst; the hardenable resin being mixed with the aggregates and being dissolved in an organic solvent;

the dielectric heating oven using radiofrequency electromagnetic waves having a frequency of less than 300 MHz, raising a temperature of the residual material by dielectric heating to 100-200 degrees Centigrade, and maintaining the temperature between 100-200 degrees Centigrade for 15-20 minutes catalyzing styrene and the resin to render the toxic substances environmentally inert.

9. The industrial production plant of claim 8, wherein the dielectric oven comprises a tunnel oven.

10. The industrial production plant of claim 8, further comprising a conveyor feeding the dielectric oven, the residual material being placed in piles having a height of 20 cm or less on the conveyor.

11. The industrial production plant of claim 8, wherein a charging station precedes the dielectric oven, the charging station comprising a lump-breaking device for breaking the residual material.

12. The method of claim 1, further comprising the step of feeding the residual material to be heated, the step being carried out by placing the residual materials in piles having a height of 20 cm on a conveyor.

13. The industrial production plant of claim 4, wherein the dielectric oven comprises a tunnel oven.

14. The industrial production plant of claim 4, wherein a charging station precedes the first station, the charging station comprising a lump-breaking device for breaking the residual material.

* * * * *